(12) United States Patent
Schultz et al.

(10) Patent No.: US 8,636,194 B2
(45) Date of Patent: Jan. 28, 2014

(54) FRICTION STIR FABRICATION

(75) Inventors: Jeffrey Patrick Schultz, Blacksburg, VA (US); Kevin Creehan, Blacksburg, VA (US)

(73) Assignee: Schultz-Creehan Holdings, Inc., Blacksburg, VA (US)

( * ) Notice: Subject to any disclaimer, the term of this patent is extended or adjusted under 35 U.S.C. 154(b) by 168 days.

(21) Appl. No.: 12/792,655

(22) Filed: Jun. 2, 2010

(65) Prior Publication Data

US 2010/0285207 A1 Nov. 11, 2010

Related U.S. Application Data

(63) Continuation of application No. 11/527,149, filed on Sep. 26, 2006, now abandoned.

(60) Provisional application No. 60/720,521, filed on Sep. 26, 2005.

(51) Int. Cl.
*B23K 20/12* (2006.01)

(52) U.S. Cl.
USPC ........................................ 228/112.1; 228/2.1

(58) Field of Classification Search
USPC ................................................ 228/2.1, 112.1
See application file for complete search history.

(56) References Cited

U.S. PATENT DOCUMENTS

| | | | |
|---|---|---|---|
| 3,217,957 A | 11/1965 | Jarvie et al. | |
| 3,279,971 A | 10/1966 | Gardener | |
| 3,292,838 A | 12/1966 | Farley | |
| 3,418,196 A | 12/1968 | Jane | |
| 3,444,611 A | 5/1969 | Bogart | |
| 3,455,015 A | 7/1969 | Henricus et al. | |
| 3,466,737 A | 9/1969 | Hanink | |
| 3,495,321 A | 2/1970 | Shaff | |
| 3,537,172 A | 11/1970 | Voznesensky Valentin et al. | |
| 3,831,262 A | 8/1974 | Luc | |
| 3,899,377 A | 8/1975 | Luc | |
| 3,949,896 A | 4/1976 | Luc | |
| 4,106,167 A | 8/1978 | Luc | |

(Continued)

FOREIGN PATENT DOCUMENTS

| | | | |
|---|---|---|---|
| EP | 0453182 A | 10/1991 | |
| EP | 0458774 A | 11/1991 | |

(Continued)

OTHER PUBLICATIONS

Berbon et al., Friction stir processing: a tool to homogenize nanocomposite aluminum alloys, Scripta Materialia, vol. 44, No. 1, pp. 61-66, Jan. 5, 2001.

(Continued)

*Primary Examiner* — Kevin P Kerns
*Assistant Examiner* — Kevin E Yoon
(74) *Attorney, Agent, or Firm* — New River Valley IP Law; Michele L. Mayberry

(57) ABSTRACT

A low-temperature friction-based coating method termed friction stir fabrication (FSF) is disclosed, in which material is deposited onto a substrate and subsequently stirred into the substrate using friction stir processing to homogenize and refine the microstructure. This solid-state process is capable of depositing coatings, including nanocrystalline aluminum and/or metal matrix composites and the like, onto substrates such as aluminum at relatively low temperatures. A method of making rod stock for use in the FSF process is also disclosed.

22 Claims, 13 Drawing Sheets

(56) References Cited

U.S. PATENT DOCUMENTS

| | | |
|---|---|---|
| 4,144,110 A | 3/1979 | Luc |
| 4,491,001 A | 1/1985 | Yoshida et al. |
| 4,625,095 A | 11/1986 | Das |
| 4,930,675 A | 6/1990 | Bedford et al. |
| 4,959,241 A | 9/1990 | Thomas et al. |
| 5,056,971 A | 10/1991 | Sartori |
| 5,249,778 A | 10/1993 | Steichert et al. |
| 5,262,123 A | 11/1993 | Thomas et al. |
| 5,330,160 A | 7/1994 | Eisermann et al. |
| 5,460,317 A | 10/1995 | Thomas et al. |
| 5,469,617 A | 11/1995 | Thomas et al. |
| 5,611,479 A | 3/1997 | Rosen |
| 5,637,836 A | 6/1997 | Nakagawa et al. |
| 5,697,511 A | 12/1997 | Bampton |
| 5,697,544 A | 12/1997 | Wykes |
| 5,713,507 A | 2/1998 | Holt et al. |
| 5,718,366 A | 2/1998 | Colligan |
| 5,769,306 A | 6/1998 | Colligan |
| 5,794,835 A | 8/1998 | Colligan et al. |
| 5,813,592 A | 9/1998 | Midling et al. |
| 5,826,664 A | 10/1998 | Richardson |
| 5,893,507 A | 4/1999 | Ding et al. |
| 5,971,247 A | 10/1999 | Gentry |
| 5,971,252 A | 10/1999 | Rosen et al. |
| 5,975,406 A | 11/1999 | Mahoney et al. |
| 6,029,879 A | 2/2000 | Cocks |
| 6,045,027 A | 4/2000 | Rosen et al. |
| 6,045,028 A | 4/2000 | Martin et al. |
| 6,050,474 A | 4/2000 | Aota et al. |
| 6,050,475 A | 4/2000 | Kinton et al. |
| 6,051,325 A | 4/2000 | Talwar et al. |
| 6,053,391 A | 4/2000 | Heideman et al. |
| 6,070,784 A | 6/2000 | Holt et al. |
| 6,119,624 A | 9/2000 | Morikawa et al. |
| 6,138,895 A | 10/2000 | Oelgoetz et al. |
| 6,168,066 B1 | 1/2001 | Arbegast |
| 6,168,067 B1 | 1/2001 | Waldron et al. |
| 6,173,880 B1 | 1/2001 | Ding et al. |
| 6,193,137 B1 | 2/2001 | Ezumi et al. |
| 6,199,745 B1 | 3/2001 | Campbell et al. |
| 6,206,268 B1 | 3/2001 | Mahoney |
| 6,213,379 B1 | 4/2001 | Takeshita et al. |
| 6,227,430 B1 | 5/2001 | Rosen et al. |
| 6,230,957 B1 | 5/2001 | Arbegast et al. |
| 6,237,829 B1 | 5/2001 | Aota et al. |
| 6,237,835 B1 | 5/2001 | Litwinski et al. |
| 6,247,633 B1 | 6/2001 | White et al. |
| 6,247,634 B1 | 6/2001 | Whitehouse |
| 6,250,037 B1 | 6/2001 | Ezumi et al. |
| 6,257,479 B1 | 7/2001 | Litwinski et al. |
| 6,259,052 B1 | 7/2001 | Ding et al. |
| 6,264,088 B1 | 7/2001 | Larsson |
| 6,273,323 B1 | 8/2001 | Ezumi et al. |
| 6,276,591 B1 | 8/2001 | Kawasaki et al. |
| 6,290,117 B1 | 9/2001 | Kawasaki et al. |
| 6,299,048 B1 | 10/2001 | Larsson |
| 6,299,050 B1 | 10/2001 | Okamura et al. |
| 6,302,315 B1 | 10/2001 | Thompson |
| 6,305,866 B1 | 10/2001 | Aota et al. |
| 6,311,889 B1 | 11/2001 | Ezumi et al. |
| 6,315,187 B1 | 11/2001 | Satou et al. |
| 6,321,975 B1 | 11/2001 | Kawasaki et al. |
| 6,325,273 B1 | 12/2001 | Boon et al. |
| 6,325,274 B2 | 12/2001 | Ezumi et al. |
| 6,328,261 B1 | 12/2001 | Wollaston et al. |
| 6,352,193 B1 | 3/2002 | Bellino et al. |
| 6,354,483 B1 | 3/2002 | Ezumi et al. |
| 6,360,937 B1 | 3/2002 | De Koning |
| 6,364,197 B1 | 4/2002 | Oelgoetz et al. |
| 6,367,681 B1 | 4/2002 | Waldron et al. |
| 6,378,264 B1 | 4/2002 | Kawasaki et al. |
| 6,378,754 B2 | 4/2002 | Aota et al. |
| 6,382,498 B2 | 5/2002 | Aota et al. |
| 6,386,425 B2 | 5/2002 | Kawasaki et al. |
| 6,398,883 B1 | 6/2002 | Forrest et al. |
| 6,413,610 B1 | 7/2002 | Nakamura et al. |
| 6,419,142 B1 | 7/2002 | Larsson |
| 6,419,144 B2 | 7/2002 | Aota |
| 6,421,578 B1 | 7/2002 | Adams et al. |
| 6,422,449 B1 | 7/2002 | Ezumi et al. |
| 6,450,394 B1 | 9/2002 | Wollaston et al. |
| 6,450,395 B1 | 9/2002 | Weeks et al. |
| 6,457,629 B1 * | 10/2002 | White ........................ 228/112.1 |
| 6,460,752 B1 | 10/2002 | Waldron et al. |
| 6,461,072 B2 | 10/2002 | Kawasaki et al. |
| 6,464,127 B2 | 10/2002 | Litwinski et al. |
| 6,471,112 B2 | 10/2002 | Satou et al. |
| 6,474,533 B1 | 11/2002 | Ezumi et al. |
| 6,484,924 B1 | 11/2002 | Forrest |
| 6,494,011 B2 | 12/2002 | Ezumi et al. |
| 6,497,355 B1 | 12/2002 | Ding et al. |
| 6,499,649 B2 | 12/2002 | Sayama et al. |
| 6,502,739 B2 | 1/2003 | Ezumi et al. |
| 6,513,698 B2 | 2/2003 | Ezumi et al. |
| 6,516,992 B1 | 2/2003 | Colligan |
| 6,527,470 B2 | 3/2003 | Ezumi et al. |
| 6,543,671 B2 | 4/2003 | Hatten et al. |
| 6,572,007 B1 * | 6/2003 | Stevenson et al. ......... 228/112.1 |
| 6,648,206 B2 | 11/2003 | Nelson et al. |
| 6,669,075 B2 | 12/2003 | Colligan |
| 6,722,556 B2 | 4/2004 | Schilling et al. |
| 6,732,901 B2 | 5/2004 | Nelson et al. |
| 6,745,929 B1 | 6/2004 | Ezumi et al. |
| 6,758,382 B1 | 7/2004 | Carter |
| 6,779,704 B2 | 8/2004 | Nelson et al. |
| 6,866,181 B2 | 3/2005 | Aota et al. |
| 6,953,140 B2 | 10/2005 | Park et al. |
| 7,036,708 B2 | 5/2006 | Park et al. |
| 7,066,375 B2 | 6/2006 | Bolser |
| 7,124,929 B2 | 10/2006 | Nelson et al. |
| 7,152,776 B2 | 12/2006 | Nelson et al. |
| 7,156,276 B2 | 1/2007 | Slattery |
| 7,163,136 B2 | 1/2007 | Hempstead |
| 7,597,236 B2 | 10/2009 | Tolle et al. |
| 7,608,296 B2 | 10/2009 | Packer et al. |
| 7,624,910 B2 | 12/2009 | Barnes et al. |
| 7,661,572 B2 | 2/2010 | Nelson et al. |
| 2002/0011509 A1 | 1/2002 | Yoshihiro et al. |
| 2002/0014516 A1 | 2/2002 | Yoshihiro et al. |
| 2002/0168466 A1 | 11/2002 | Tapphorn |
| 2002/0179682 A1 | 12/2002 | Schilling et al. |
| 2003/0010805 A1 | 1/2003 | Nelson et al. |
| 2003/0042292 A1 | 3/2003 | Hatten et al. |
| 2003/0075584 A1 | 4/2003 | Sarik et al. |
| 2004/0118899 A1 | 6/2004 | Aota et al. |
| 2004/0134972 A1 | 7/2004 | Nelson et al. |
| 2004/0155093 A1 | 8/2004 | Nelson et al. |
| 2004/0265503 A1 | 12/2004 | Clayton |
| 2005/0006439 A1 | 1/2005 | Packer et al. |
| 2005/0045695 A1 * | 3/2005 | Subramanian et al. .... 228/112.1 |
| 2005/0051599 A1 | 3/2005 | Park et al. |
| 2005/0060888 A1 | 3/2005 | Park et al. |
| 2005/0127139 A1 * | 6/2005 | Slattery et al. ............. 228/112.1 |
| 2005/0210820 A1 | 9/2005 | Tanaka et al. |
| 2005/0242158 A1 | 11/2005 | Bolser |
| 2006/0016854 A1 | 1/2006 | Slattery |
| 2006/0060635 A1 | 3/2006 | Slattery |
| 2006/0096740 A1 | 5/2006 | Zheng |
| 2006/0208034 A1 | 9/2006 | Packer et al. |
| 2007/0040006 A1 * | 2/2007 | Charles et al. ............. 228/112.1 |
| 2007/0075121 A1 | 4/2007 | Slattery |
| 2007/0102492 A1 | 5/2007 | Nelson et al. |
| 2007/0138236 A1 | 6/2007 | Agarwal et al. |
| 2007/0187465 A1 | 8/2007 | Eyre et al. |
| 2007/0241164 A1 | 10/2007 | Barnes et al. |
| 2007/0295781 A1 | 12/2007 | Hunt et al. |
| 2007/0297935 A1 | 12/2007 | Langan et al. |
| 2008/0041921 A1 | 2/2008 | Creehan et al. |
| 2009/0188101 A1 | 7/2009 | Durandet et al. |
| 2009/0258232 A1 | 10/2009 | Brice |
| 2010/0089976 A1 | 4/2010 | Szymanski et al. |
| 2010/0089977 A1 | 4/2010 | Chen et al. |

(56) References Cited

U.S. PATENT DOCUMENTS

| | | |
|---|---|---|
| 2010/0146866 A1 | 6/2010 | Nelson et al. |
| 2010/0258612 A1 | 10/2010 | Kolbeck et al. |

FOREIGN PATENT DOCUMENTS

| | | |
|---|---|---|
| EP | 0458774 A1 | 11/1991 |
| EP | 0410104 B1 | 7/1993 |
| EP | 0597335 A | 5/1994 |
| EP | 0597335 A1 | 5/1994 |
| GB | 572789 A | 10/1945 |
| GB | 1224891 A | 3/1971 |
| GB | 2270864 A | 3/1994 |
| GB | 2306366 A | 5/1997 |
| JP | 11267857 A * | 10/1999 |
| SU | 1393566 | 5/1988 |

OTHER PUBLICATIONS

Friction Stir Tooling: Tool Materials and Designs, Chapter 2 in Friction Stir Welding and Processing, pp. 7-35, ASM International, Editors Rajiv S. Mishra & Murray W. Mahoney, 2007.

Metal-Matrix Composites (ASM Metals Handbook Online, ASM International, 2002), Introduction, Aluminum-Matrix Composites.

Derwent machine translation of SU-1393566.

International Search Report and Written Opinion of International Application No. PCT/US2012/032793, Dec. 18, 2012.

* cited by examiner

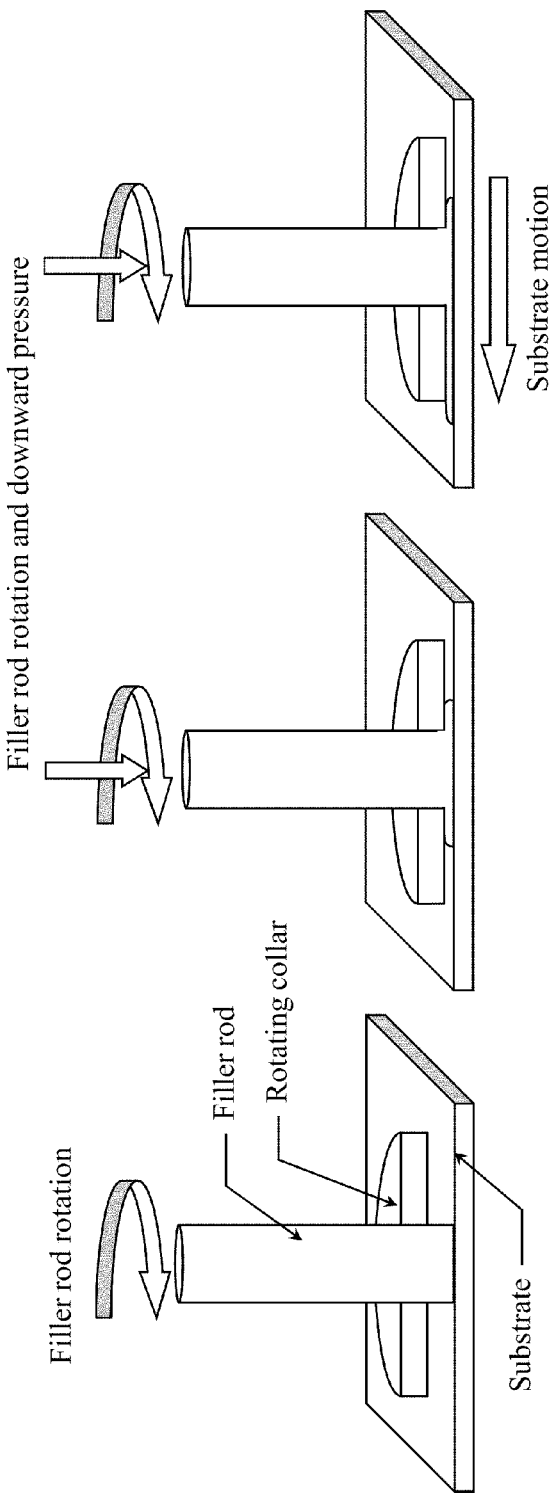
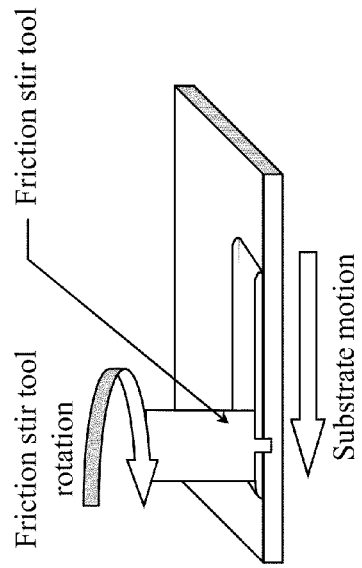

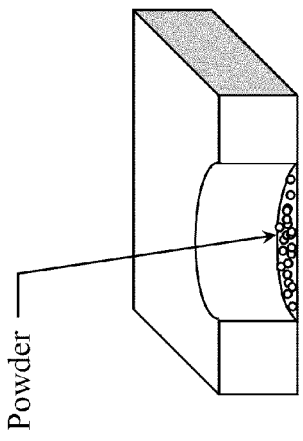
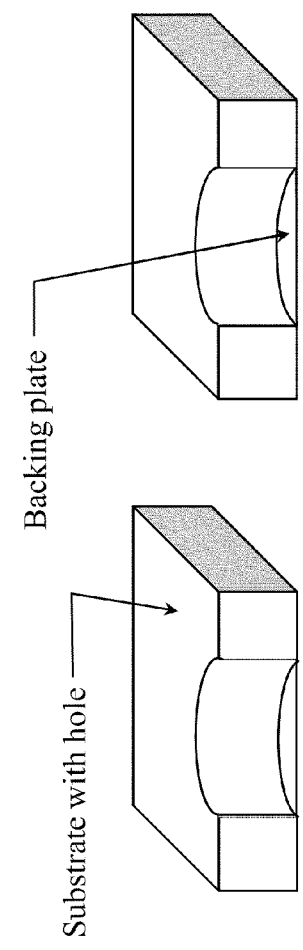
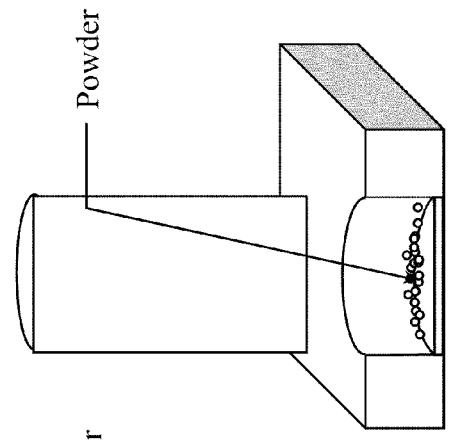
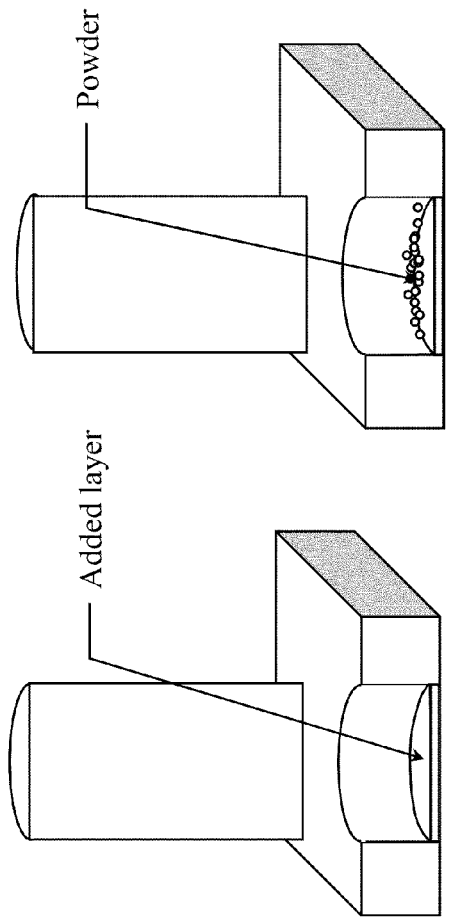
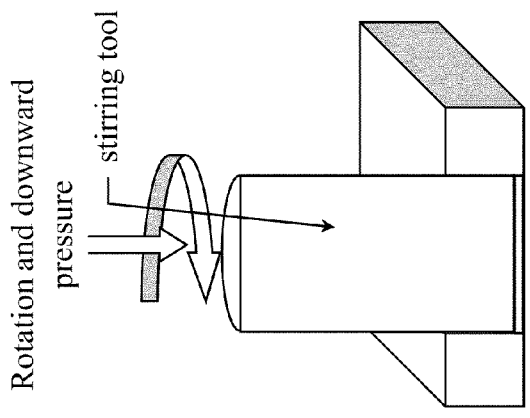

US 8,636,194 B2

FRICTION STIR FABRICATION

CROSS-REFERENCE TO RELATED APPLICATIONS

This application is a Continuation Application under 35 U.S.C. §120 of U.S. patent application Ser. No. 11/527,149, filed Sep. 26, 2006, which claims priority to and the benefit of the filing date of U.S. Patent Application No. 60/720,521, filed Sep. 26, 2005, which are incorporated herein by reference in their entirety.

GOVERNMENT CONTRACT

The present invention was supported by the United States Office of Naval Research under Contract No. N00014-05-1-0099. The United States Government has certain rights in this invention.

FIELD OF THE INVENTION

The present invention relates to friction stir fabrication, and more particularly relates to coating, surface modification and repair of substrates using friction stirring techniques, as well as the production of friction stir rod stock.

BACKGROUND INFORMATION

Conventional thermal spray coating techniques, such as flame spray, high-velocity oxygen fuel (HVOF), detonation-gun (D-Gun), wire arc and plasma deposition, produce coatings that have considerable porosity, significant oxide content and discrete interfaces between the coating and substrate. These coating processes operate at relatively high temperatures and melt/oxidize the material as it is deposited onto the substrate. Such conventional techniques are not suitable for processing many types of substrates and coating materials, such as nanocrystalline materials due to the grain growth and loss of strength resulting from the relatively high processing temperatures.

SUMMARY OF THE INVENTION

One embodiment of the present invention provides a low-temperature friction-based coating method termed friction stir fabrication (FSF), in which material is deposited onto a substrate and subsequently stirred into the substrate using friction stir processing to homogenize and refine the microstructure. This solid-state process is capable of depositing coatings, including nanocrystalline aluminum and/or metal matrix composites and the like, onto substrates such as aluminum at relatively low temperatures. For example, friction stir fabrication may be used to add new material to the surfaces of 2519 and 5083 Al, thus modifying the surface compositions to address multiple application requirements. Coatings produced using FSF have superior bond strength, density, and lower oxide content as compared to other coating technologies in use today. The friction stir fabrication process may also be used to fill holes in various types of substrates. The present invention also provides a method of making friction stirring rod stock.

An aspect of the present invention is to provide a method of forming a surface layer on a substrate. The method comprises depositing a coating material on the substrate, and friction stirring the deposited coating material.

Another aspect of the present invention is to provide a method of filling a hole in a substrate. The method comprises placing powder of a fill material in the hole, and friction stirring the fill material powder in the hole to consolidate the fill material.

A further aspect of the present invention is to provide a method of making consumable friction stirring rod stock. The method comprises placing powder of a coating material in a die, friction stirring the coating material powder in the die to consolidate the coating material, and recovering a rod comprising the consolidated coating material.

These and other aspects of the present invention will be more apparent from the following description.

BRIEF DESCRIPTION OF THE DRAWINGS

FIGS. 1a-1d schematically illustrate a friction stir fabrication process in accordance with an embodiment of the present invention.

FIGS. 2a-2f schematically illustrate a friction stir hole repair method in accordance with an embodiment of the present invention.

DETAILED DESCRIPTION

Figure 3A:
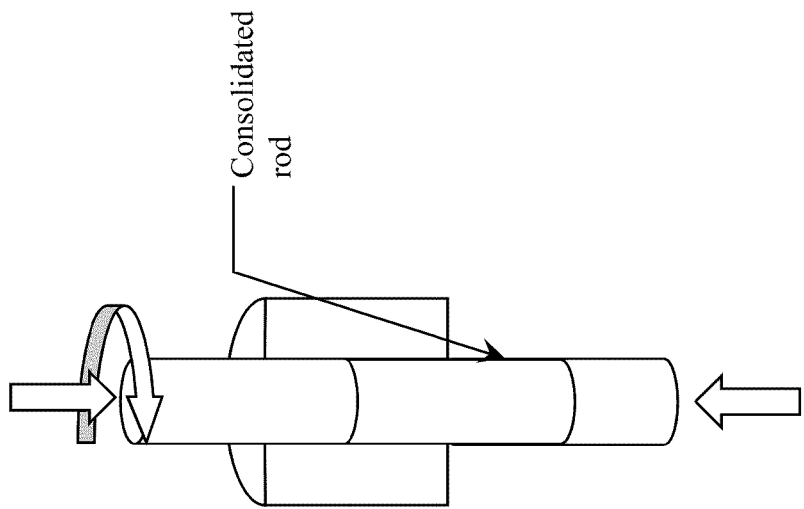
FIGS. 3a-3d schematically illustrate a method of making a consumable friction stirring rod in accordance with an embodiment of the present invention.

A friction stir fabrication process in accordance with an embodiment of the present invention includes two steps: coating deposition followed by friction stir processing. The coating step imparts sufficient interfacial adhesion such that friction stir processing does not delaminate the coating from the substrate.

In accordance with an embodiment of the present invention, friction stirring is used to deposit a coating material on a substrate by frictional heating and compressive loading of a rod comprising the coating material against the substrate. The applied load is increased, beyond what would be required to join the rod to the substrate, and the portion of the rod adjacent to the substrate deforms under the compressive load. The deformed metal is then trapped below a rotating shoulder and sheared across the substrate surface as the substrate translates.

FIGS. 1a-1d show a step-by-step schematic of the process. FIGS. 1a-1c illustrate the deposition of material onto the substrate, and FIG. 1d shows the subsequent friction stir processing used to ensure metallurgical bonding between the substrate and coating, and to homogenize and refine the microstructure of the coating.

In the method illustrated in FIG. 1a, a collar is attached to a rod comprising the coating material, leaving approximately 3 mm of the rod beneath the collar. As shown in FIG. 1b, this 3 mm section is pressed into the substrate while rotating at approximately 3500 RPM. As shown in FIG. 1c, the coating material is spread evenly across the surface of the substrate with a layer thickness of about 0.4 mm. The collar is then repositioned on the filler rod, leaving the bottom 3 mm of the filler rod beneath the collar, and the process is repeated. As shown in FIG. 1d, once an entire cross-sectional layer is deposited on the surface of the substrate, the coated substrate is friction stir processed to homogenize the new layer and promote interlayer adhesion. Additional layers may then be applied in a similar manner until the desired coating thickness is achieved.

An alternative to the friction stirring deposition method described above is to deposit the coating material via cold spray, which is a relatively low-temperature thermal spray process in which particles are accelerated through a supersonic nozzle. However, such cold spray techniques may be relatively expensive. In addition to its substantial processing cost, the cold spray technique is unable to process high aspect ratio particles, such as the nanocrystalline aluminum powder produced by cryomilling, and the resultant deposited material contains oxide impurities. As such, the friction stirring deposition method may be preferable to cold spray techniques.

In accordance with an embodiment of the present invention, the coating material is deposited on the substrate in nanocrystalline form. After the deposited coating has been friction stirred, the nanocrystalline structure of the coating material may be maintained. As used herein, the term "nanocrystalline" means a material in which the average crystal grain size is less than 0.5 micron, typically less than 100 nanometers. Due to the fact that the friction stirring process is carried out at a relatively low temperature below the melting point of the coating material, little or no crystal grain growth occurs during the friction stirring process.

In accordance with another embodiment of the present invention, the coating material comprises a metal matrix composite (MMC). As used herein, the term "metal matrix composite" means a material having a continuous metallic phase having another discontinuous phase dispersed therein. The metal matrix may comprise a pure metal, metal alloy or intermetallic. The discontinuous phase may comprise a ceramic such as a carbide, boride, nitride and/or oxide. Some examples of discontinuous ceramic phases include SiC, $TiB_2$ and $Al_2O_3$. The discontinuous phase may also comprise an intermetallic such as various types of aluminides and the like. For example, titanium aluminides such as TiAl and nickel aluminides such as $Ni_3Al$ may be provided as the discontinuous phase. The metal matrix may typically comprise Al, Ni, Mg, Ti, Fe and the like.

To produce Al—SiC metal matrix composite coatings, aluminum tubes may be filled with silicon carbide powder and used as coating rods. The filled tubes may yield an Al—SiC coating, but the volume fraction of the reinforcement may vary locally. However, for precise volume fraction control, homogenous metal matrix composite rods containing the appropriate volume fraction may be used instead of powder filled tubes.

The reinforcement of the metal matrix composite coating may be incorporated into the matrix by traditional blending techniques or grown in-situ from elemental metals using reaction synthesis. Table 1 lists example MMC systems which can be formed using reaction synthesis. In reaction synthesis, elemental metals react due to the thermal and/or mechanical energy imparted during processing to form intermetallic or ceramic particulates. The rotation of the stirring tool and feed material relative to the substrate may generate frictional heat which raises the temperature of the elemental constituents to that at which the reaction can initiate. As the reactions of elemental metals used for reaction synthesis are exothermic, additional heat is evolved in the formation of the intermetallic particles. An aspect of using FSF to form in-situ MMC coatings is the fact that the shearing of the metal by the stirring tool and rotation of the feed material cracks and disperses the oxide barrier coatings, which exist on all metal exposed to oxygen, providing a high concentration of the metal-to-metal contact required for the reaction to occur. In FSF-based reaction synthesis, the reacting metal may be provided from the substrate and the feed metal, or all of the reacting metals could be provided from the feed material.

TABLE 1

Reaction Synthesis of In-situ MMCs Using FSF

Ti + $x$Al → TiAl + ($x$ − 1)Al (Aluminum matrix with TiAl reinforcement)
3Ni + $y$Al → $Ni_3Al$ + ($y$ − 1)Al (Aluminum matrix with $Ni_3Al$ reinforcement)
2B + $z$Ti → $TiB_2$ + ($z$ − 1)Ti (Titanium matrix with $TiB_2$ reinforcement)
Ti + $w$Ni → NiTi + ($w$ − 1)Ni (Nickel matrix with NiTi reinforcement)

In-situ MMCs may exhibit enhanced mechanical properties as compared to MMCs formed ex-situ, i.e., by blending the matrix and reinforcement. In-situ formation of MMCs yields relatively small single crystal reinforcements, which are thermodynamically stable in the matrix. Furthermore, in-situ formation results in clean, unoxidized particles, and thus the interfacial strength between the reinforcement and matrix is higher than that of ex-situ MMCs.

Various types of substrates may be coated using the friction stir fabrication process of the present invention. For example, metal substrates comprising Al, Ni, Mg, Ti, Fe and the like may be coated. Furthermore, polymers and ceramics may be provided as the substrate. For example, the substrate may comprise a thermoplastic material.

In accordance with an embodiment of the present invention, the coating material is deposited on the substrate at a temperature below a melting temperature of the coating material. For example, deposition may be performed at a temperature of from 100 to 500° C. or more below the melting point of the coating material. When the coating material comprises Al, the material may be deposited on a substrate at a temperature below about 500° C., typically below about 400° C. After the coating material is deposited, subsequent friction stirring of the material is also preferably performed below the melting temperature of the coating material. For example, when the coating material comprises Al, friction stirring temperatures may be maintained below about 500° C., typically below about 400° C. Furthermore, the friction stirring process may be performed at a temperature below a melting temperature of the substrate.

Another embodiment of the metal deposition method may significantly reduce the labor and time requirements. In the process, the filler rod is delivered to the substrate surface using a "push" method, where a rotating-plunging tool pushes a rod of finite length through the rotating spindle. The spindle is rotated independently using an additional motor while the milling machine rotates the plunging tool. As the spindle and plunging tool rotate, the filler rod is pressed into the substrate surface with the down force of the plunging tool. This design allows a large volume of raw material to be fed to the substrate surface as compared to manual methods. As the rod material is spread onto the substrate, the plunging tool continues to feed more filler rod through the spindle onto the substrate. For example, up to 75 mm or more of filler rod can be fed through the spindle. With machine design improvements, the length of the rod stock may be increased.

This "push" method is a feasible solution to the filler rod delivery challenge, but in the interest of processing speed could be further improved upon. For continuous deposition, a "pull" method, where the spindle rotation pulls the rod into the spindle, may be employed so that the rod length can be increased and the rods can be fed continuously. A method for pulling the rod into the spindle is to employ a threaded section on the inner diameter of the spindle throat. During the deposition process, the spindle rotates at a slightly slower rate than the rotating rod stock. Due to the difference in rotational velocities, the threaded portion of the neck pulls the rod through the spindle and forces the metal under the rotating shoulder. The difference in rotational velocity between the rod and the spindle, coupled with the pitch of the internal threads in the spindle, determine the coating deposition rate. It may be desired to actively control the temperature of the rod inside and outside the spindle so that the thermally induced softening of the filler rod is not totally dependent on frictional heating. Such thermal control provides means to increase deposition rates to meet application requirements.

Another embodiment of the present invention provides a method of repairing holes in substrates, and a way to modify the local properties of a substrate. A hole repair method is illustrated in FIGS. 2a-2f. As shown in FIG. 2a, the repair process begins with a substrate having a hole of known diameter. If the hole is not circular in cross-section or has an unknown or undesired diameter, it may be machined to create a hole equal to the diameter of the stirring tool used in FIG. 2d. As shown in FIG. 2b, if the hole is a through-hole, it may be necessary to apply a backing plate, e.g., composed of either the substrate material or the filler material. The backing plate serves as a base for the friction processing to follow, and may be inset into the lower surface of the substrate if desired. As shown in FIG. 2c, a layer of loose powder is deposited into the hole, and subsequently stirred into the backing plate or the bottom of the hole, as shown in FIG. 2d, with a stirring tool subsequently equal in diameter to that of the hole. FIG. 2e illustrates the resultant layer of material added to the bottom of the hole. FIG. 2f illustrates the deposition of more loose powder into the hole, which may be stirred as shown in FIG. 2d. This process may be repeated until the hole is filled. As the depth of the fill approaches the top of the substrate, flash material may accumulate around the surface of the hole. Once the fill depth reaches the substrate surface, the flash material may be cut away leaving a smooth surface.

The hole-repair method may be used to modify the properties of a surface. A series of holes with any given depth may be drilled into a substrate and then re-filled, using the hole-repair method, with a material having the desired local properties, thereby selectively modifying the local properties of the substrate. With multiple stirring tools across the work volume, the processing time for an entire work piece may be reduced, and the ability to selectively vary the local microstructure may be readily accomplished.

Because material flexibility is possible using the present process, the desired alloys and material volume fractions are not always readily available in the rod stock form needed for the raw material. As such, an aspect of the present invention is to provide a friction stir stock fabrication method that uses powder as its raw material. This stock fabrication method provides the ability to produce cylindrical rods from a wide variety of materials and composites in various volume fractions. Further, in contrast to the cold spray coating method, this friction stir stock fabrication method is able to process high aspect ratio particles, such as those produced through cryomilling, which allows for the inexpensive construction of nanocrystalline rods for deposition by friction stir fabrication.

A variation of the hole filling method may be used for production of rod stock to supply the solid-state friction deposition process described above. Because the hole filling method utilizes powder as its raw material, limitless material and volume fraction flexibility exists for production of rods and cylinders by this method. For example, the composition of the rod stock may be graded along its length, in which case coatings made from the rod during the FSF process may have different compositions and properties which vary gradually from one area of the coating to another, e.g., one area of the FSF coating may have relatively high hardness while another area may have relatively high corrosion resistance. To deposit advanced materials such as nanocrystalline aluminum and/or aluminum MMCs using FSF, rod stock of these materials with predictable and repeatable volume fractions is desired. As these advanced materials are not commercially available in rod form, the present low-pressure high-shear powder compaction (LPHSPC) process, as shown in FIGS. 3a-3d, may be used to provide rods of coating materials for the FSF process.

Figure 3B:
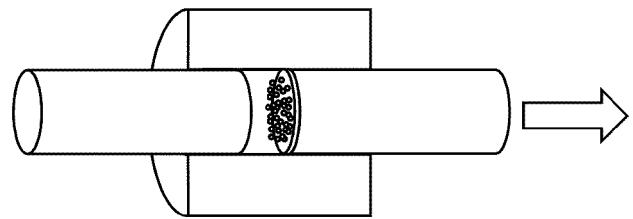
Figure 3C:
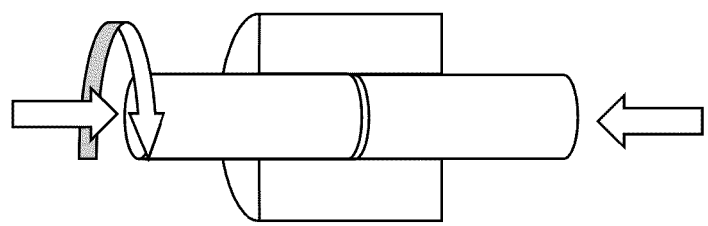
Figure 3D:
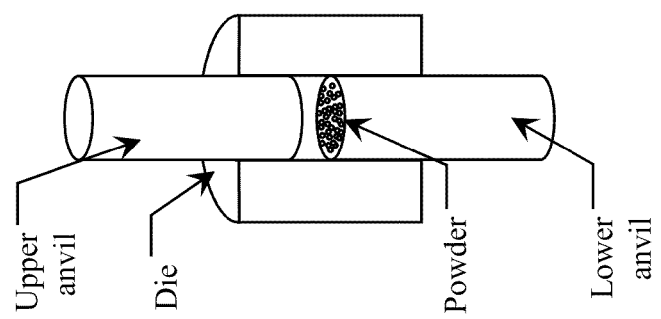

In one embodiment, LPHSPC may be accomplished by manually depositing approximately 0.25 g of powder into a cylindrical cavity, as schematically shown in FIG. 3a, and then manually applying a downward compaction force with a spinning cylindrical tool, as shown in FIG. 3b. As shown in FIGS. 3c and 3d, the powder deposition and spinning steps are repeated. The downward pressure and shear from the spinning tool compact the powder and adhere it to the previous layer. Fully dense sections of, e.g., ⅜ and ½-inch diameter, rods may be fabricated from microcrystalline and nanocrystalline aluminum powders using the manual method. However, rods of significant length may be fabricated by automated methods for use as feed stock for FSF systems. Thus, constructing an automated low-pressure high-shear powder compaction unit may be desirable.

Once the coating has been deposited onto the surface of the substrate, e.g., using the solid-state friction deposition method, it may then be friction stir processed to adhere the coating to the surface of the substrate and refine the coating microstructure. The goal of the friction stir process is to produce a homogenous coating with a bond strength approaching the ultimate tensile strength of the base alloy. The quality of the friction stirred regions of the substrates may be optimized, including eliminating any channel present along the length of the friction stir path. Elimination of the channel may be achieved by using a friction stir tool with a threaded pin. By modifying the stirring tool geometry, coated substrates may be produced without channels through the use of a threaded-tapered stirring tool.

The following examples are intended to illustrate various aspects of the invention, and are not intended to limit the scope of the invention. In the following examples, different deposition geometries are used to test the bond strength between 5083 Al and a ½ inch deposit of nanocrystalline Al (7 w % Mg, cryomilled 4 hrs); and test the bond strength between 5083 Al and a ½ inch deposit of 6063 Al—SiC (10 v %). Small tensile specimens were cut such that the 5083 Al substrate and the coating (nanocrystalline Al or Al—SiC) each composed half of the specimen and the interface plane between the coating and substrate was in the middle of the gauge length, normal to the loading direction.

Friction stir fabrication was used to coat 2519 and 5083 Al substrates as follows: 2519 and 5083 Al plates with Al—SiC surface layers—the Al—SiC coating was comprised of 6063 Al and approximately 10 v % SiC powder (1 mm average particle size); A 2519 Al plate with a copper-free surface to enhance the corrosion resistance—the copper-free coating was made from 6063 Al; A 5083 Al plate with a nanocrystalline aluminum deposit to enhance the impact resistance—the nanocrystalline aluminum alloy contained 7 w % Mg, and was cryomilled for 4 hours; A half-inch, curved Al—SiC rib on a 5083 Al plate—the rib was composed of 6063 Al and approximately 10 v % SiC powder (1 mm average particle size); and repair of a one-inch diameter hole in a 5083 Al plate without adversely affecting the plate microstructure—the material used for the repair process was either commercially pure Al or nanocrystalline Al (due to machine limitations, the diameter of the hole was reduced to a half-inch).

EXAMPLE 1

Figures 4, 5:
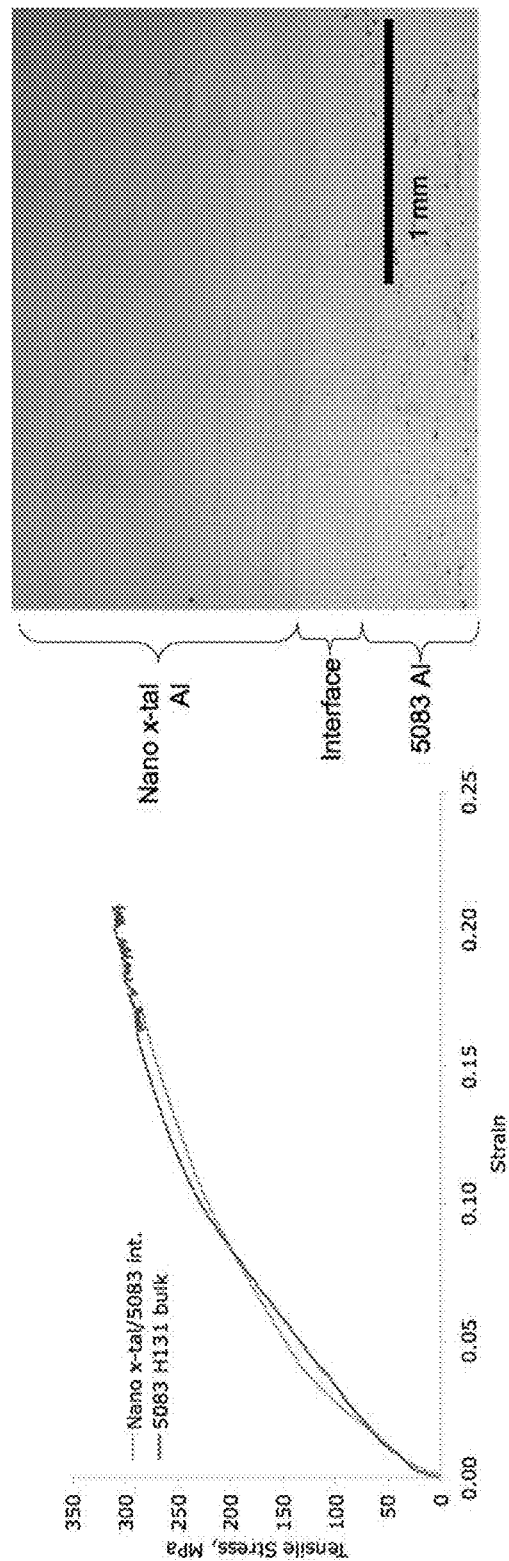
FIG. 4 illustrates stress-strain curves for a 5083 Al substrate material and a 5083 Al nanocrystalline interface for a friction stir coated sample produced in accordance with an embodiment of the present invention.
FIG. 5 is a photomicrograph of a polished friction stir fabricated 5083 Al sample corresponding to FIG. 4.
Figure 6:
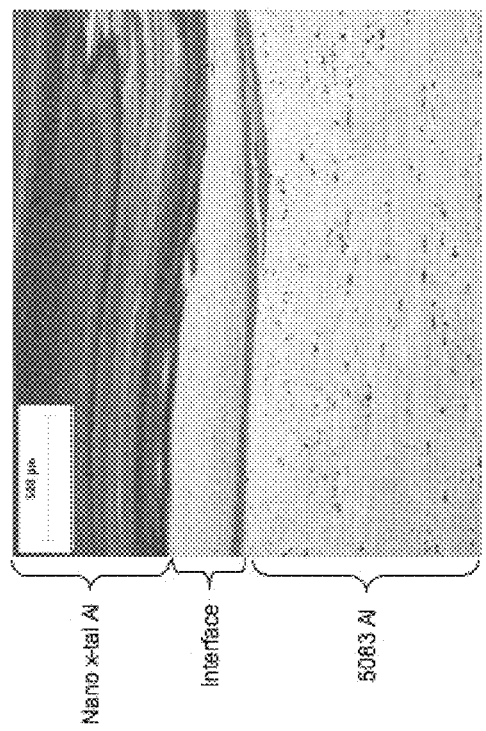
FIG. 6 is a photomicrograph of an etched friction stir fabricated 5083 Al sample corresponding to FIG. 4.

5083 Al plate was coated with nanocrystalline aluminum deposit. Because the nanocrystalline Al was a limited supply and in powder form, the coating deposit was made using the "hole-filling" method and the interface at the bottom of the hole was the interface of interest. FIG. 4 shows representative stress-strain curves for bulk 5083 Al, and the 5083 Al substrate with nanocrystalline Al coating. The micrographs of FIGS. 5 and 6 show the interfacial region between the substrate and the deposit as polished and etched, respectively. The microstructure in the nanocrystalline region is very fine while the 5083 is characterized by large precipitates and large high aspect ratio grains.

Consolidated deposits of nanocrystalline Al powder are preferably homogenous and fully dense. All of the 5083 Al-nanocrystalline Al tensile specimens tested failed at or near the interface at approximately 75-95% of the bulk 5083 ultimate tensile strength, indicating that metallurgical bonding occurred between the base metal and the deposit.

Figure 14:
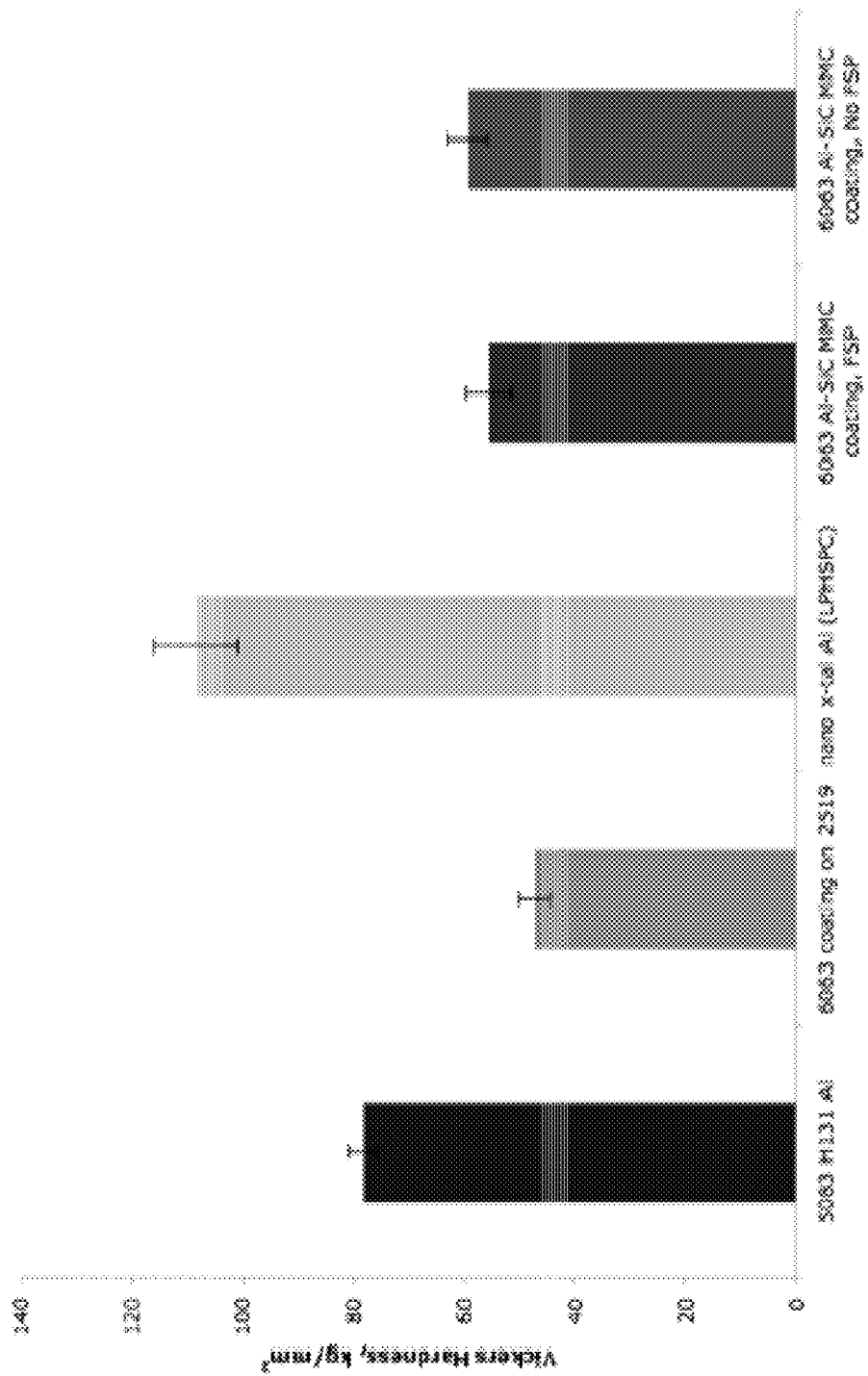
FIG. 14 shows Vickers hardness values for various substrate and coating materials.

The range of bond strengths measured was 227-285 MPa, at least 2.5 times larger than any of the bond strengths reported for thermal spray coatings (Table 2). The hardness of the 5083 Al and nanocrystalline Al were measured to be 78.1±2.5 HV and 108.5±7.5 HV respectively (FIG. 14 summarizes the FSF coating hardness values), indicating that after consolidation the nanocrystalline Al retains strength superior to 5083 Al.

EXAMPLE 2

An aluminum substrate was coated with an Al—SiC metal matrix composite. SiC-powder-filled 6063 Al tubes were used as the deposition material for samples with an Al—SiC MMC coating. The matrix for the MMC coating may be commercially pure (CP) Al, however, CP Al tubes of the desired diameter may not be readily available. Therefore, 6063 T5 Al tubes may be substituted for CP Al tubes for this demonstration. 6063 Al was selected because it contains silicon, which limits the dissolution of silicon from the silicon carbide reinforcement. Such dissolution would lead to the formation of $Al_4C_3$, a detrimental brittle phase. The average particle size (APS) of the SiC powder used was 1 mm and the volume fraction of SiC in the composites was approximately 10 vol. %.

EXAMPLE 3

Figure 7:
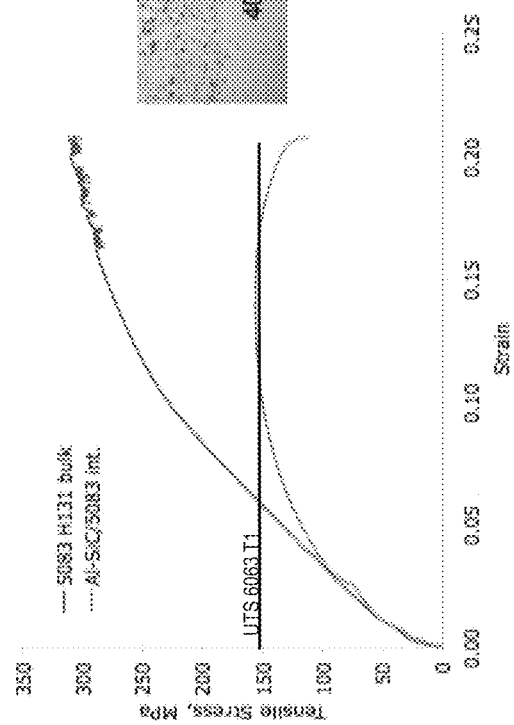
FIG. 7 illustrates stress-strain curves for a 5083 Al substrate and a friction stir fabricated 6063 Al—SiC (10 volume percent) coating deposited on a 5083 Al substrate.
Figure 8:
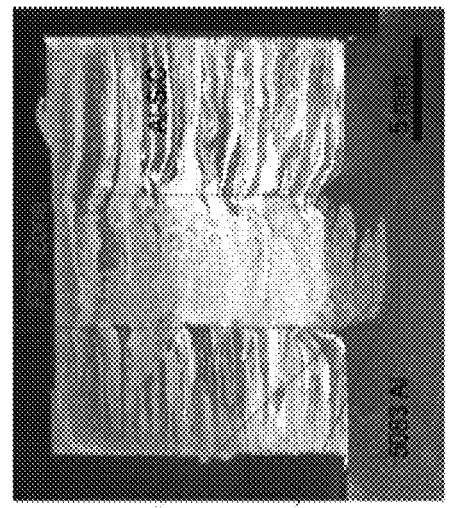
FIG. 8 is a photomicrograph of a 5083 Al/6063 Al—SiC (10 volume percent) friction stir fabricated sample corresponding to FIG. 7, showing the substrate, friction stir fabricated coating, and interfacial region therebetween.

A 5083 Al plate was coated with an Al—SiC metal matrix composite. To test the bond strength between 5083 Al and 6063 Al—SiC (10 v %), a ½-inch thick MMC coating was deposited on a 5083 Al substrate using FSF with SiC filled 6063 Al T5 tubes as the feed rod. FIG. 7 shows a stress-strain curve for the 5083 Al substrate and the interface between the substrate and the Al—SiC metal matrix composite coating. A cross-section of the polished MMC coating and substrate are shown on the right side of FIG. 8. Significant improvements in both the coating and interfacial microstructure have been made. The improvements primarily result from the use of a threaded-tapered stirring tool for post-deposition friction stir processing. A friction stir processing pass was made (the stirring tool translated normal to the cross-section shown in the micrograph) after each incremental increase in the coating thickness of approximately ⅛-inch. As is evident from the micrograph, the friction stir processed (FSP) zone has a relatively homogeneous microstructure while the areas to the left and right of the FSP zone exhibit a layered heterogeneous microstructure. In the FSP zone, the interface between the substrate and the MMC is diffuse, and SiC reinforcement is present approximately 2 mm below the original substrate surface. The inset micrograph in the middle of the figure shows the area of maximum SiC penetration.

The continuity of the aluminum matrix throughout the interfacial region and into the substrate indicates that metallurgical bonding occurred between the MMC and substrate. Tensile specimens were cut from the coating/substrate on the vertical mid-line of the FSP zone with the interface in the center of the gauge length, normal to the loading direction. FIG. 7 shows a representative stress-strain curve for the coating/substrate tensile specimens and for bulk 5083 Al; the ultimate tensile strength (UTS) of 6063 T1 Al is also indicated on the graph. Failure of the coating/substrate tensile specimen occurred in the gage length at 157 MPa on the MMC side of the interface; significant necking was observed in the MMC. All coating/substrate tensile specimens failed in the MMC half of the sample due to the low strength of the 6063 Al matrix alloy. 6063 Al has an ultimate tensile strength of 150 MPa in the T1 condition (cooled from fabrication temperature and naturally aged).

The bond strength of the coating/substrate interface nearly doubles that of the best available competing thermal spray process.

EXAMPLE 4

Figure 9:
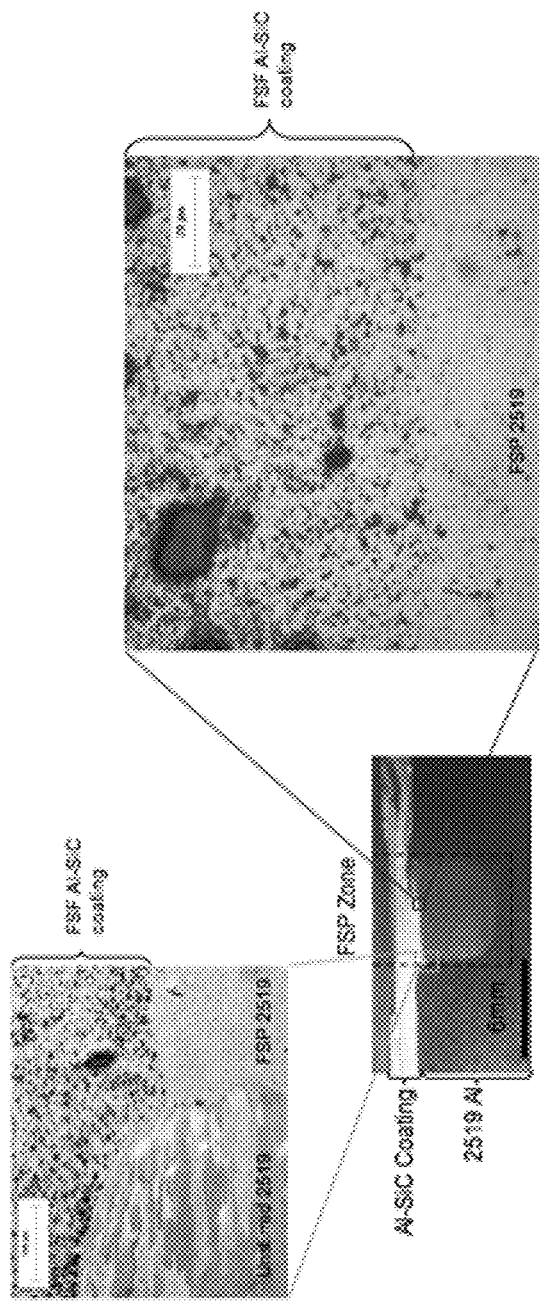
FIG. 9 is a photomicrograph of a 2519 Al substrate friction stir coated with a 6063 Al—SiC metal matrix composite in accordance with an embodiment of the present invention, including magnified regions thereof.

A 1.5 mm thick Al—SiC MMC coating was deposited on a 2519 Al substrate using the FSF process in a manner similar to that of Example 3. The micrograph on the right side of FIG. 9 shows the coating/substrate interfacial region, which occurs below the original substrate surface. As observed in the MMC coated 5083 sample, the metal matrix is continuous through the thickness of the interfacial region and into the substrate indicating that metallurgical bonding has occurred between the coating and substrate. The micrograph on the top left in FIG. 9 shows the MMC coating as well as friction stir processed and unstirred 2519 after etching. It is evident from the micrograph that the microstructure in the FSP zone has been refined and the grain size significantly reduced. The macro-Vickers hardness of the MMC coating in the friction stir processed zone and the un-stirred zone are 56±4 HV and 59±4 HV, respectively. The hardness of FSF 6063 Al is 47±3 HV (FIG. 14). Thus, addition of approximately 10 vol % SiC results in a 20% increase in the coating hardness.

EXAMPLE 5

Figure 10:
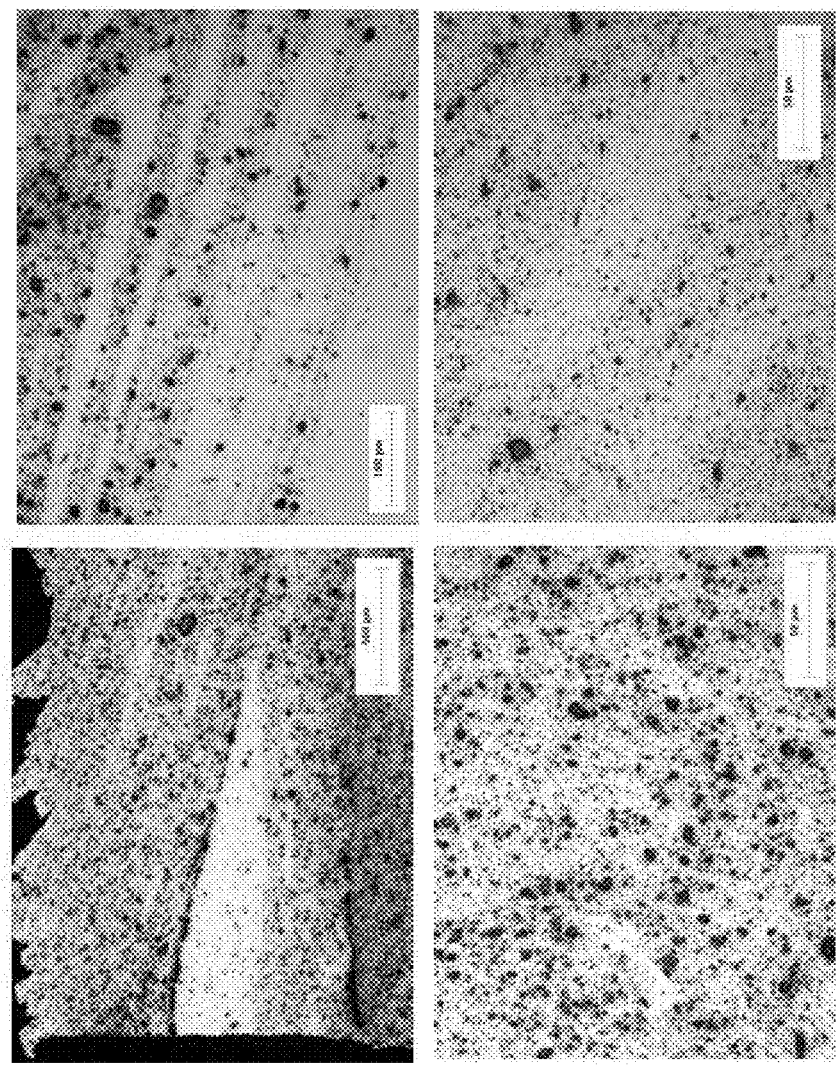
FIG. 10 is a series of photomicrographs of an Al—SiC friction stirred coating in accordance with an embodiment of the present invention.

A curved Al—SiC rib (2.5 mm tall, 13 mm wide, 90 mm long) was built on a 5083 Al plate using the solid-state metal deposition method. Visually, it is clear that the silicon carbide particulates have been incorporated into the 6063 Al matrix and the rib material has been adhered to the substrate. FIG. 10 shows four micrographs of the Al—SiC rib material at different magnifications. Friction stir processing of the Al—SiC rib shown in these micrographs was done using a stirring tool with an unthreaded cylindrical pin. The use of this stirring tool resulted in some variation in the local SiC volume fraction (bottom two micrographs) and a channel at the bottom of the FSP zone. Subsequent processing of the same MMC coating and 5083 Al substrate with improved tool geometry produced homogeneous coatings without a channel, as described in the previous sections.

The lowest magnification image in FIG. 10 (upper left) shows a corner of the rib on the retreating side of the friction stir pass; it is apparent that some inhomogeneity exists in the local SiC volume fraction. The upper right micrograph shows the interfacial region at the edge of the FSP zone. No discontinuity between the matrix and substrate is observed and a banded dispersion of SiC exists due to repeated FSP of the rib.

This experiment demonstrates that the FSF process has the ability to deposit discontinuously reinforced metal matrix composites in varying and complex shapes. The process is not limited by shape or height, and produces structures with no discrete interface between the deposited structure and the substrate.

EXAMPLE 6

A 1.25 mm thick surface layer of copper-free 6063 Al was added to a 2519 Al plate (approximately 4×4 inches) using friction stir fabrication. Commercially pure (CP) Al may be specified for coating the 2519 surface, however, CP Al rods in the desired diameter may not be readily available. Therefore, 6063 Al may be substituted for CP Al for this demonstration because 6063 Al contains no copper and has relatively good corrosion resistance.

Figure 11:
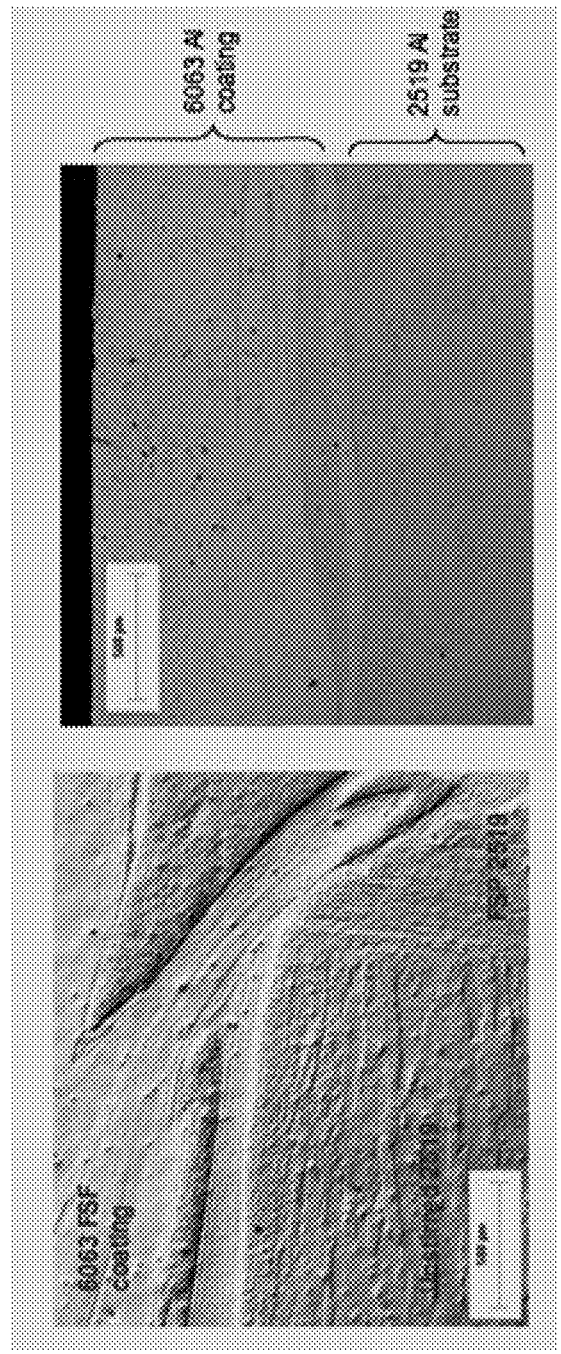
FIG. 11 is a photomicrograph of a 6063 Al friction stirred coating on a 2519 Al substrate produced in accordance with an embodiment of the present invention.

The resulting structure is as desired, a coherent coating that completely shields the more corrosive 2519 Al from the surface. FIG. 11 shows micrographs of the coating and substrate in the as polished state and etched conditions. The microstructure in the FSP zone has been refined and the grain size significantly reduced. The interface between the substrate and coating shows no visible porosity and exhibits banding, alternating layers of coating and substrate material. The hardness of FSF 6063 Al coating on the 2519 Al substrate was determined to be 47±3 HV (FIG. 16).

Figure 12:
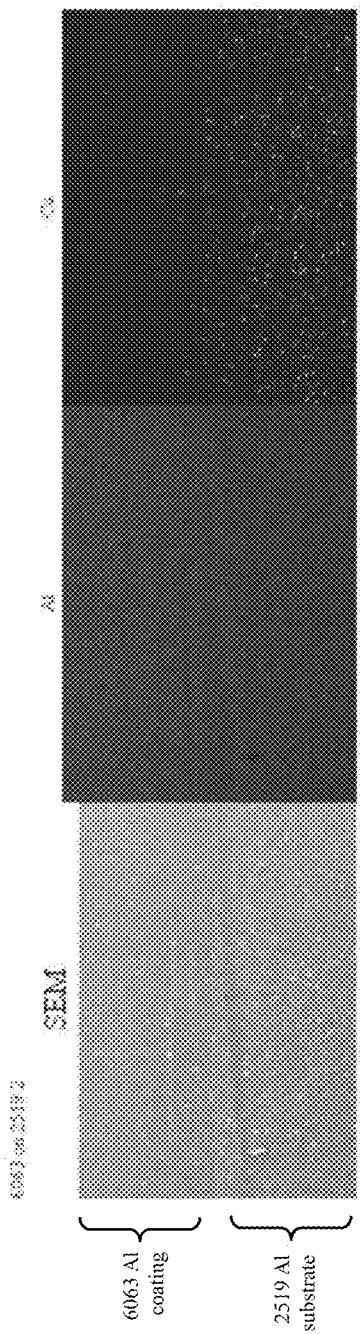
FIG. 12 includes an SEM image of the 6063 Al friction stirred coating of FIG. 11, and corresponding EDS maps for aluminum and copper.

This demonstrates the feasibility of adding corrosion-resistant material to the surface of a substrate using the present friction stir fabrication process. FIG. 12 shows a scanning electron microscope (SEM) micrograph (left) and elemental maps of Al (middle) and Cu (right) obtained by energy dispersive spectroscopy (EDS). The EDS maps show that the 6063 Al coating provides a copper-free layer on top of the 2519 substrate. Further, there is no limit on the thickness of the material that can be added to the substrate due to the additive nature of the FSF process.

EXAMPLE 7

Figure 13:
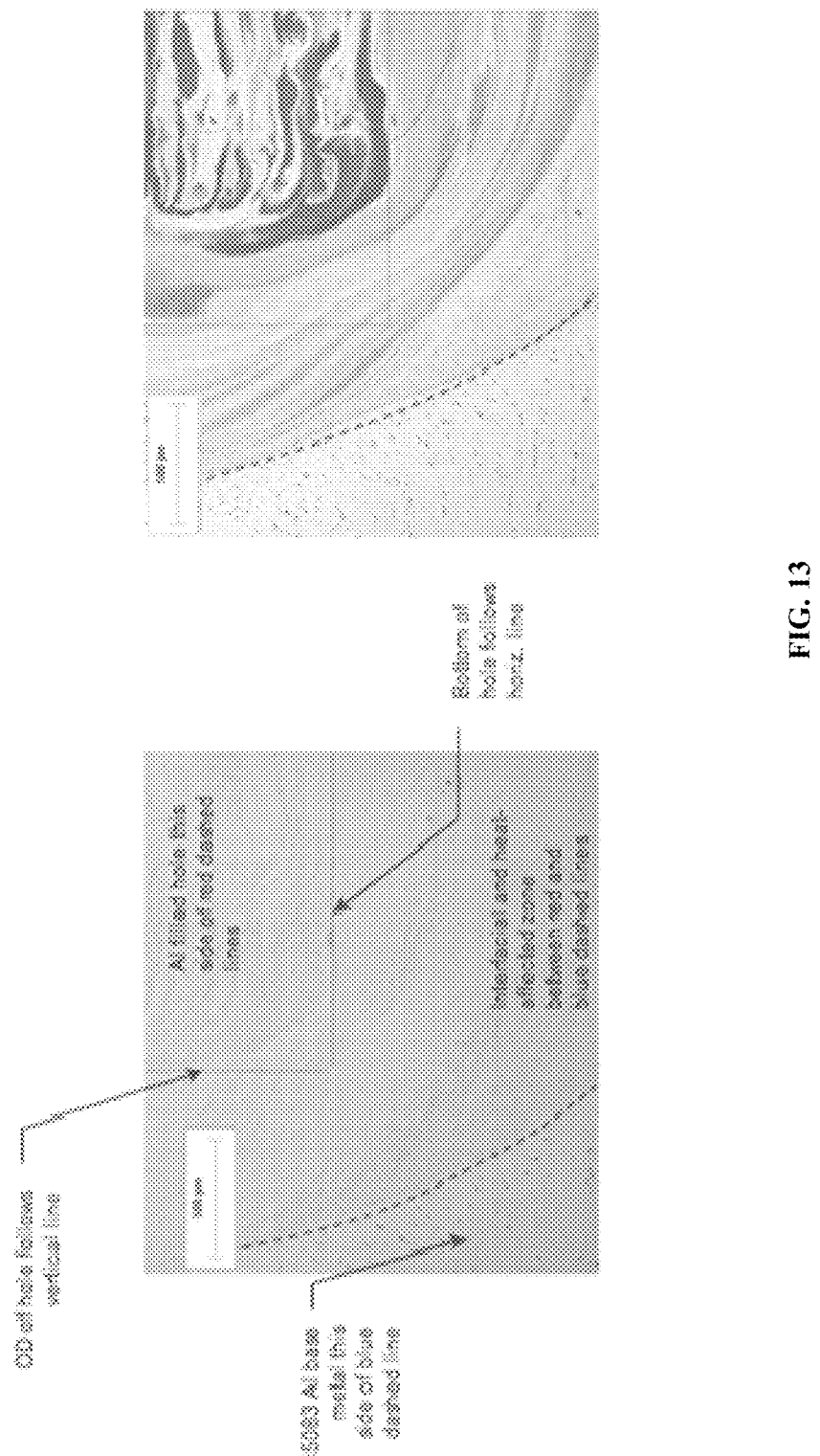
FIG. 13 illustrates photomicrographs of a 5083 Al substrate with a hole filled by a 5083 Al friction stirred material in accordance with an embodiment of the present invention.

A hole was repaired in a 5083 Al plate. Multiple holes in 5083 plates were repaired/filled with commercially pure aluminum or nanocrystalline aluminum using the hole-repair method similar to that shown in FIG. 2. The diameter of the hole was one half-inch for this demonstration. FIG. 13 show micrographs of a portion of the bottom and outer-diameter of a hole repaired with nanocrystalline aluminum in the polished and etched states. No porosity is observed between the stirred layers or at the interface of the hole. The discontinuous porosity that was observed and reported in previous progress reports has been eliminated through process improvements. A large heat-affected zone exists surrounding the hole, showing that significant heat and shearing forces were present as a result of the repeated stirring action.

Friction stir fabrication is a solid-state process capable of depositing coatings, including nanocrystalline aluminum and/or metal matrix composites, onto aluminum substrates at relatively low temperatures. Coatings produced using FSF have superior bond strength, density, and oxidation characteristics as compared to other coating technologies in use today. Mature thermal spray technologies, such as flame spray, high-velocity oxygen fuel (HVOF), detonation-gun (D-Gun), wire arc and plasma deposition, produce coatings that have considerable porosity, significant oxide content and a discrete interface between the coating and substrate. These coating processes operate at relatively high temperatures and melt/oxidize the material as it is deposited onto the substrate. Therefore, these technologies are not suitable for processing nanocrystalline materials due to the resulting grain growth and loss of strength.

The major process and coating characteristics for common thermal spray processes are listed in Table 2 in comparison with friction stir fabrication processes in accordance with embodiments of the present invention. In addition to high operating temperatures, another significant drawback to conventional thermal spray coating is relatively low bond strength. The bond strengths of thermal spray processes are relatively low because there is limited metallurgical bonding to the substrate due to the lack of mechanical and/or thermal energy imparted to the substrate during coating. Thermal spray coating could be compared to soldering or brazing; the substrate or base metal is not metallurgically bonded to the coating via a long-range diffuse interface.

TABLE 2

Capabilities of Existing Coating Processes and FSF

|  | Flame Spray | HVOF | D-Gun | Wire Arc | Cold Spray | Plasma Spraying | FSF nano x-tal on 5083 Al | FSF 6063 Al—SiC MMC on 5083 Al |
|---|---|---|---|---|---|---|---|---|
| Heat Source | Oxyacetylene | Fuel gases | Oxygen/Acetylene detonation | Electric arc | Resistance heater | Plasma arc | Friction | Friction |
| Typical Processing Temperature (° C.) | 3000 | 3000 | 4500 | >3800 | 20-700 | 16000 | ~350 | ~350 |
| Relative Density (%) | 85-90 | >95 | >95 | 80-95 | 97-99 | 90-99 | >99 | >99 |
| Bond Strength, (MPa) | 7-18 | 68 | 82 | 10-40 | 70 (est.) | 68 | 227-285* | >150* |
| Oxides | High | Moderate to dispersed | Small | Moderate to high | Prior particle boundaries | Moderate to coarse | None observed | None observed |

*Experimental results show that the bond strength is approximately equal to the ultimate tensile strength of the weakest component, substrate or coating.

The FSF process may be used to meet coating needs, e.g., coating nanocrystalline Al and Al MMCs onto vehicle armor for enhanced ballistic impact resistance. Of interest is the bond strength between the FSF coating and the base armor because the through-thickness mechanical properties of a layered system often never approach those of the individual components due to relatively low bond strength.

The materials produced in accordance with the present invention may be used for various applications such as ballistic impact resistant armor. For example, for a particular vehicle to achieve the survivability and weight reduction objectives, the ballistic impact resistance of the armor of the vehicle should be enhanced through the use of high-strength advanced engineering materials such as nanocrystalline aluminum and/or aluminum metal matrix composites (MMCs). The strengths (two to three times that of the bulk microcrystalline alloy) and reasonable ductilities (approximately 4%) of these advanced aluminum-based materials make them ideal candidates for ballistic coatings on 2519 and 5083 Al armor plate.

In addition to providing enhanced ballistic impact resistance, coating the base armor plate also has the potential to mitigate corrosion problems present in copper rich alloys such as 2519 Al. Furthermore, the use of nanocrystalline aluminum for bosses which serve as attachment points for armor panels, electronic components, seats, and other equipment on the EFV would realize additional weight savings and strength improvements. For these advanced materials to be deployed, a cost effective method for depositing thick coatings with minimal deleterious effects on the microstructure of the substrate and coating material must be developed. Current thermal spray technologies are not suited for depositing these advanced Al-based materials, primarily due to the high processing temperatures, which lead to significant grain growth and loss of strength.

The FSF coating process of the present invention imparts significant shear stresses on the coating/substrate interface, resulting in bond strengths significantly higher than those observed in thermal spray coating processes. Additionally, because FSF is a solid-state process, it is more suited to the processing of grain growth-prone materials such as nanocrystalline aluminum.

Factors that influence the deposition rate are translation speed, shoulder diameter, layer thickness, and delays resulting from manual processes. The angular velocity of the spindle is an important variable from the perspective of frictional heating and deposition quality, but does not directly factor into the deposition rate unless poor deposition quality leads to necessary rework. Once the acceptable angular velocity range for the spindle is established for a given coating material, this variable will no longer have an impact on the deposition rate but could be used to manipulate the frictional heat input and thus the structure and properties of the coating. The deposition efficiency of the FSF process is nearly 100%. Material waste (scrap) in the FSF process occurs only when machining flash at the edge of the FSP region. This waste can be minimized or eliminated in a number of ways, including process and product design.

Figure 15:
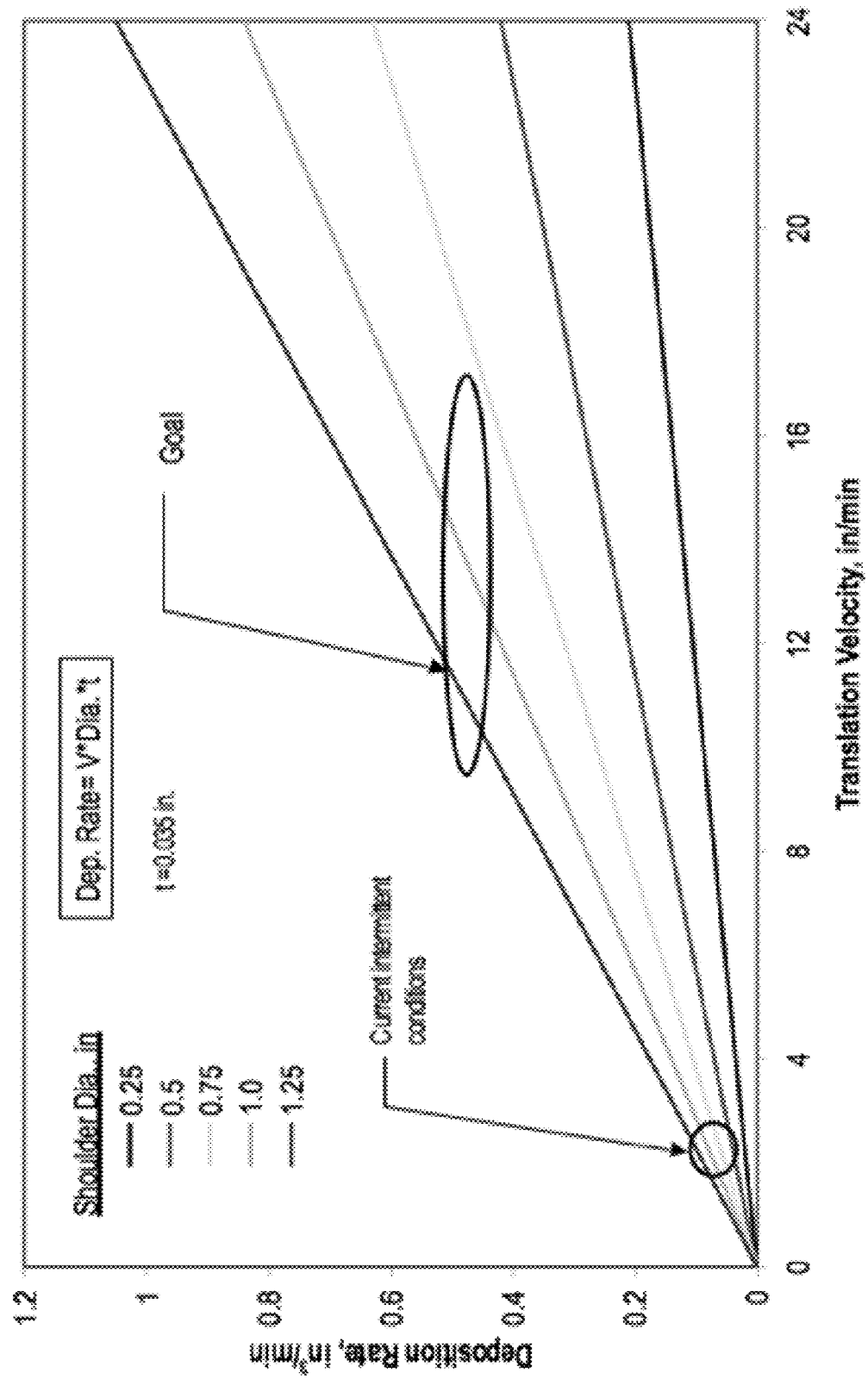
FIG. 15 is a graph of deposition rate versus translation velocity for friction stir coating processes of the present invention.

A spindle capable of continuous deposition will eliminate manual intervention and setup delays, and allow material to be continuously fed through the spindle to the substrate surface. For continuous deposition, the material deposition rate will be equal to the product of the translation speed, shoulder diameter, and layer thickness. FIG. 15 illustrates the relationship of these process variables to the deposition rate. Given a layer thickness of 0.035 inches (0.9 mm), to meet the goal of 30-40 cubic inches of deposition per hour (1.3-1.6 kg/hour for Al), the translation speed must be increased to 10-16 inches per minute (250-410 mm/min) for a shoulder diameter in the range of 0.75-1.25 inches (19-32 mm). Long-term, the deposition rate should be improved to equal or exceed that of HVOF and other mature thermal spray technologies.

Friction stir fabrication is an effective and potentially efficient method of producing a variety of aluminum-based coatings. Using a manual deposition method, the FSF process was able to produce coatings, from advanced materials in the solid-state, with at least twice the bond strength of the most competitive coating technology. In addition, a wide variety of aluminum feed stock for FSF can be fabricated using the powder compaction process, allowing for wide-ranging material flexibility in FSF coatings. It may be desirable to provide an automated coating unit that can perform reproducibly over a wide range of process parameters and is capable of in-situ process monitoring. Consistent performance and the ability to monitor spindle speed, torque, and deposition temperature will afford the ability to detail the link between the FSF process and the coating structure and properties. Once the process-structure-property relationship map has been established and the key process elements and parameters identified, process development can then focus on designing automated FSF equipment with enhanced deposition rates.

Whereas particular embodiments of this invention have been described above for purposes of illustration, it will be evident to those skilled in the art that numerous variations of the details of the present invention may be made without departing from the invention.

The invention claimed is:

1. A friction stir tool comprising:
   a non-consumable body formed from material capable of resisting deformation when subject to frictional heating and compressive loading;
   a throat with an internal shape defining a passageway that is a through hole with a tubular throat surface extending lengthwise through the non-consumable body, wherein the tubular throat surface is attached to and imposes dependent co-rotation of a consumable coating material about a central axis of the consumable coating material and by lengthwise engagement between the consumable coating material and the tubular throat surface, during rotation of the non-consumable body;
   whereby the non-consumable body is operably configured for imposing frictional heating and compressive loading of the consumable coating material against a substrate, and comprises a surface for trapping the consumable coating material in a volume between the non-consumable body and a substrate, and for forming and shearing a surface of the coating on the substrate.

2. The friction stir tool of claim 1, wherein the coating material is a rod, cylinder, tube, powder, or powder filled tube.

3. The friction stir tool of claim 1, wherein the stirring tool and coating material are attached in a manner to allow for repositioning of the stirring tool on the coating material.

4. The friction stir tool of claim 2, wherein the coating material has an outer surface and the stirring tool has an inner surface, wherein the outer and inner surfaces have outlines of the same shape.

5. The friction stir tool of claim 4, wherein the outer surface of the coating material and the inner surface of the stirring tool are capable of engaging or interlocking to provide rotational velocity to the coating material from the stirring tool during co-rotation.

6. The friction stir tool of claim 1 comprising a pin.

7. The friction stir tool of claim 1 comprising no pin.

8. The friction stir tool of claim 6, wherein the surface for trapping the consumable coating material in a volume between the non-consumable body and a substrate is annular and has a flat surface geometry.

9. The friction stir tool of claim 7, wherein the surface for trapping the consumable coating material in a volume between the non-consumable body and a substrate is non-annular and has a flat surface geometry.

10. The friction stir tool of claim 6, wherein the surface for trapping the consumable coating material in a volume between the non-consumable body and a substrate is annular and is modified to have a non-flat surface geometry.

11. The friction stir tool of claim 7, wherein the surface for trapping the consumable coating material in a volume between the non-consumable body and a substrate is non-annular and is modified to have a non-flat surface geometry.

12. The friction stir tool of claim 1, wherein there is a single rotational axis of the consumable and the rotational axis and the central axis of the consumable are the same axis.

13. The friction stir tool of claim 1, wherein the lengthwise engagement between the consumable coating material and the throat surface is due to non-frictional force.

14. The friction stir tool of claim 1, wherein the through hole has an entrance and an exit for the consumable coating material to pass through and the through hole has a cross-sectional area that is the same from the exit to a mid-point between the entrance and the exit.

15. A method of forming a surface layer on a substrate comprising:
    depositing a coating on a substrate by way of frictional heating and compressive loading of a coating material against the substrate using a stirring tool comprising:
       a non-consumable body formed from material capable of resisting deformation when subject to frictional heating and compressive loading;
       a throat with an internal shape defining a passageway that is a through hole with a tubular throat surface extending lengthwise through the non-consumable body, wherein the tubular throat surface is attached to and imposes dependent co-rotation of a consumable coating material about a central axis of the consumable coating material and by lengthwise engagement between the consumable coating material and the tubular throat surface, during rotation of the non-consumable body;
       whereby the non-consumable body is operably configured for imposing frictional heating and compressive loading of the consumable coating material against a substrate, and comprises a surface for trapping the consumable coating material in a volume between the non-consumable body and a substrate, and for forming and shearing a surface of the coating on the substrate.

16. The method of claim 15, wherein the stirring tool is operably configured to comprise a shoulder facing the substrate for forming and shearing a surface of the coating.

17. The method according to claim 15, wherein the depositing comprises spreading the coating material across the substrate by translating, relative to one another, a stirring tool and the substrate, wherein the stirring tool comprises a shoulder for trapping and shearing coating material below the shoulder.

18. The method of claim 15, wherein the depositing comprises pressing and translating the coating material against and across the substrate while rotating the coating material with a stirring tool which causes frictional heating of the coating material and substrate.

19. The method of claim 15, wherein the coating material is consumable and the stirring tool is non-consumable.

20. The method of claim 19, wherein the coating material is a rod, cylinder, tube, powder, or powder filled tube.

21. The method of claim 15, wherein the coating material and the throat are operably configured to provide for continuous feeding of the coating material through the throat of the stirring tool.

22. The method of claim 15, wherein the coating material has an outer surface and the stirring tool has an inner surface, wherein the outer and inner surfaces have outlines of the same shape.

* * * * *